United States Patent
Payne et al.

(10) Patent No.: US 9,863,316 B2
(45) Date of Patent: Jan. 9, 2018

(54) INTAKE ARRANGEMENT IN GAS TURBINE POWER PLANT

(71) Applicant: ALSTOM Technology Ltd, Baden (CH)

(72) Inventors: Robin Payne, Wettingen (CH); Eribert Benz, Birmenstorf (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 570 days.

(21) Appl. No.: 14/444,130

(22) Filed: Jul. 28, 2014

(65) Prior Publication Data

US 2015/0050140 A1  Feb. 19, 2015

(30) Foreign Application Priority Data

Aug. 14, 2013 (EP) .................................. 13180467

(51) Int. Cl.
*F02C 7/042* (2006.01)
*F02C 1/00* (2006.01)
*F02C 3/34* (2006.01)
*F02C 7/04* (2006.01)
*F02C 7/08* (2006.01)

(52) U.S. Cl.
CPC .............. *F02C 7/042* (2013.01); *F02C 1/005* (2013.01); *F02C 3/34* (2013.01); *F02C 7/04* (2013.01); *F02C 7/08* (2013.01)

(58) Field of Classification Search
CPC .............. F02C 1/005; F02C 7/042; F02C 3/34
USPC ........................................................ 60/39.52
See application file for complete search history.

(56) References Cited

U.S. PATENT DOCUMENTS

| 6,502,383 B1 | 1/2003 | Janardan et al. |
| 6,854,260 B2 | 2/2005 | Anderson |
| 7,017,331 B2 | 3/2006 | Anderson |

(Continued)

FOREIGN PATENT DOCUMENTS

| CH | 701 235 A1 | 12/2010 |
| CN | 1942665 A | 4/2007 |

(Continued)

OTHER PUBLICATIONS

Office Action dated Sep. 16, 2015, by the State Intellectual Property Office, P.R. China in corresponding Chinese Patent Application No. 201410398647.4, and an English Translation of the Office Action. (17 pages).

(Continued)

*Primary Examiner* — Janie Loeppke
(74) *Attorney, Agent, or Firm* — Buchanan Ingersoll & Rooney PC

(57) ABSTRACT

An improved intake arrangement, for a compressor having a compressor blading, includes a manifold divided by a barrier into two sections, to convey, from one section, a flue gas stream, and, from other section, an air stream. Further, the intake arrangement includes a converging section configured to the manifold and extends convergingly to the compressor defining an inlet to the compressor blading. The converging section includes inner and outer ring members disposed coaxially to each other, between which there extends, coaxially and convergingly, the barrier to at least up to a certain distance within the converging section, defining a converging nozzle therebetween. The converging nozzle includes a mixing feature adapted to enhance mixing of the flue gas and air streams.

10 Claims, 3 Drawing Sheets

(56) References Cited

U.S. PATENT DOCUMENTS

| | | |
|---|---|---|
| 7,111,448 B2 | 9/2006 | Anderson |
| 7,251,927 B2 | 8/2007 | Anderson |
| 7,621,371 B2 | 11/2009 | Porte |
| 8,069,647 B2 | 12/2011 | Anderson |
| 2003/0196425 A1 | 10/2003 | Anderson |
| 2004/0074224 A1 | 4/2004 | Hebert |
| 2004/0159092 A1 | 8/2004 | Anderson |
| 2005/0138915 A1 | 6/2005 | Bardagi et al. |
| 2005/0247046 A1 | 11/2005 | Anderson |
| 2005/0262826 A1 | 12/2005 | Anderson |
| 2006/0242944 A1 | 11/2006 | Anderson |
| 2008/0202847 A1 | 8/2008 | Porte |
| 2010/0170261 A1 | 7/2010 | Stieger et al. |
| 2011/0265448 A1 | 11/2011 | Anderson |
| 2012/0090326 A1 | 4/2012 | Rofka et al. |
| 2012/0240590 A1 | 9/2012 | Hellat et al. |

FOREIGN PATENT DOCUMENTS

| | | |
|---|---|---|
| CN | 101263295 A | 9/2008 |
| EP | 2 503 106 A1 | 9/2010 |
| EP | 2 642 098 A1 | 9/2013 |
| JP | H08-291720 A | 11/1996 |
| JP | H09-170453 A | 6/1997 |
| JP | 2001-020755 A | 1/2001 |
| JP | 2002-180903 A | 6/2002 |
| JP | 2012-088037 A | 5/2012 |
| JP | 2012-233429 A | 11/2012 |
| WO | 2012/101087 A1 | 8/2012 |

OTHER PUBLICATIONS

Office Action (Notification of Reasons for Refusal) dated Aug. 10, 2015, by the Japanese Patent Office in corresponding Japanese Patent Application No. 2014-164794, and an English Translation of the Office Action. (5 pages).

INTAKE ARRANGEMENT IN GAS TURBINE POWER PLANT

CROSS-REFERENCE TO RELATED APPLICATIONS

This application claims priority to European application 13180467.6 filed Aug. 14, 2013, the contents of which are hereby incorporated in its entirety.

TECHNICAL FIELD

The present disclosure relates to gas turbine power plants, and, more particularly, to intake arrangements in the gas turbine power plants with flue gas recirculation.

BACKGROUND

In re-circulation of the exhaust gases, a substantial fraction of the exhaust gases is separated from the overall exhaust gases and is normally delivered again, after cooling and purification, to a compressor. The exhaust gas composition differs considerably from the composition of fresh ambient air. The recirculated exhaust gas stream, in conventional flue gas recirculation, of the gas turbine configuration, is mixed with the fresh ambient air from the surroundings and this mixture is subsequently delivered to the compressor.

Proper mixing of the flue gas with the fresh ambient air may be required for effectively working of the gas turbine engines. In order to enable proper mixing, conventionally, mixers with blowers, such as a finger type mixer, are typically used. However, due to blowers being costly and requirement of additional space in a power plant, and use thereof in further detrimental to the power and efficiency of the power plant; there is need of such a system, which may be capable of enhancing mixing of the flue gas and the fresh ambient air in economical and effective manner without the requirement of the such blowers or mixers.

SUMMARY

The present disclosure describes an improved intake arrangement with enhanced mixing of the recirculated flue gas and fresh ambient air in gas turbine power plants, that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe an improved intake arrangement to enhance mixing of the recirculated flue gas and fresh ambient air in gas turbine power plants. Another object of the present disclosure is to describe an improved intake arrangement, which is effective in mixing the recirculated flue gas and the fresh ambient air in the gas turbine power plants in an adaptable and economical manner. Various other objects and features of the present disclosure will be apparent from the following detailed description and claims.

The above noted and other objects, in one aspect, may be achieved by an intake arrangement for a gas turbine engine having a compressor and a compressor blading configured thereon. The intake arrangement includes a manifold. The manifold includes a first end portion and a second end portion. The second end portion is distal from the first end portion. The second end portion lies proximate to the compressor. The manifold includes at least one barrier, which is configured to divide the manifold into at least two sections in a manner that the divided sections extend along the manifold from the first end portion to the second end portion. The divided sections are adapted, to convey, from the at least one section thereof, a flue gas stream, and, from the at least other section thereof, an air stream. The flue gas stream and the air stream are conveyed through respective sections from the first end portion of the manifold.

Further, the intake arrangement includes a converging section configured along the second end portion of the manifold. The converging section is adapted to extend convergingly towards the compressor to define an inlet thereof. The converging section includes inner and outer ring members disposed coaxially to each other.

Between the inner and outer ring members there extends, coaxially and convergingly, the at least one barrier to at least up to a certain distance within the converging section to define a converging nozzle therebetween. The converging nozzle includes a mixing feature that may be disposed or configured thereon at any desired location in order to provide best possible result.

The mixing feature is adapted to provide turbulence in the flue gas and air streams upon deployment therefrom, creating a region of high vorticity 'R' in the converging section. The mixing feature promotes mixing of the flue gas and air streams to convey a mixed composition of the flue gas and air streams to the compressor blading. The mixed composition of the flue gas and air streams may increase the compressor operating efficiency and range.

In one embodiment, the at least one barrier of the manifold may include a plurality of barriers. Such plurality of barriers divides the manifold into a plurality of sections, which extend from the first end portion to the second end portion of the manifold. The plurality of sections is adapted to convey, from one-set of the plurality of sections thereof, the flue gas streams, and, from other-set of the plurality of sections thereof, the air streams. The plurality of barriers extends convergingly between the inner and outer ring members, as mentioned above, to at least up to the certain distance in the converging section to define a plurality of converging nozzle therebetween. Further each such converging nozzle includes the mixing feature.

The distance up to which the barrier extends within the converging section is posterior to the region of high vorticity 'R.'

In one embodiment of the present disclosures, the mixing feature may be adapted to be circumferentially configured along the converging nozzle.

In one embodiment, the mixing feature may include a combination of alternating and adjoining troughs and ridges. Such troughs and ridges may, respectively, bend in and bent out from a plain of the converging nozzle. The combination of the troughs and the ridges may be at least one of a wavy and a conical shaped configuration.

In other embodiment, the mixing feature may include a combination of alternating and adjoining peaks and depths. Such peaks and depths may be configured along a plain of the converging nozzle. The combination of the peaks and the depths may be at least one of a wavy and a conical shaped configuration.

In one further embodiment, the mixing feature may be configured by a plurality of additional surfaces disposed along the converging nozzle.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "third" and the like, herein do not denote any order, elevation or importance, but rather are used to distinguish one element from another. Further, the terms "a" and "an" herein do not denote a limitation of quantity, but rather denote the presence of at least one of the referenced item.

Figure 1:
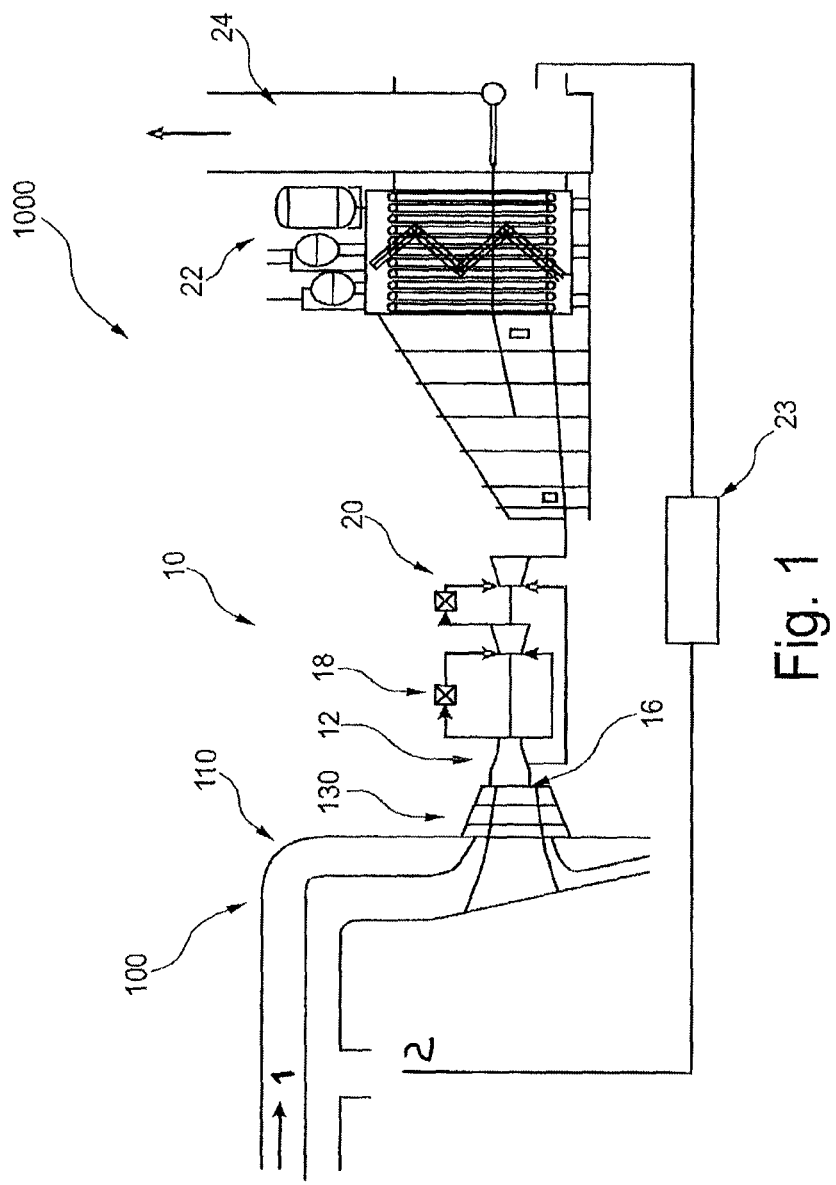
FIG. 1 illustrates an example of a gas turbine power plant depicting an intake arrangement, in accordance with an exemplary embodiment of the present disclosure.
Figure 2:
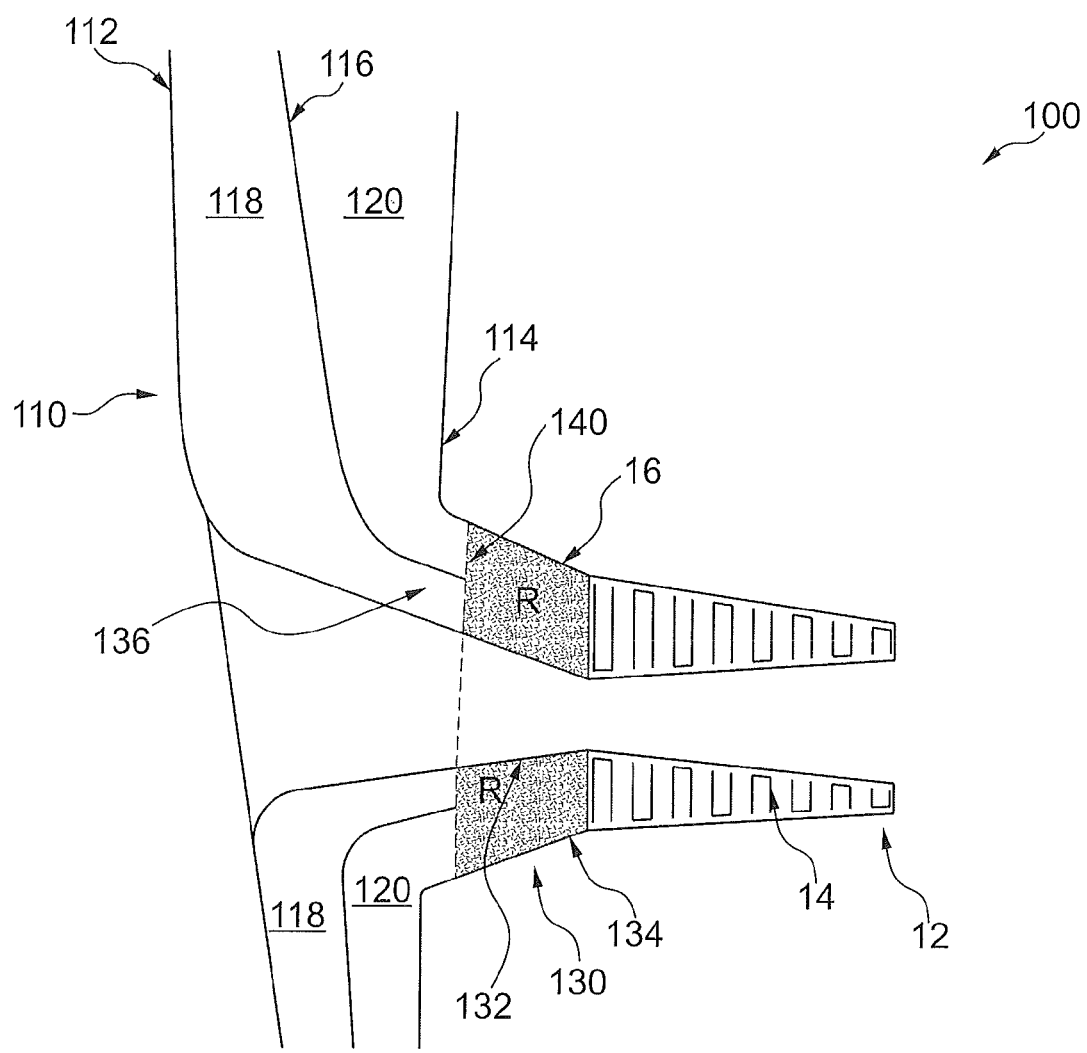
FIG. 2 illustrates side view of the intake arrangement of FIG. 1, in accordance with an exemplary embodiment of the present disclosure.
Figure 3A:
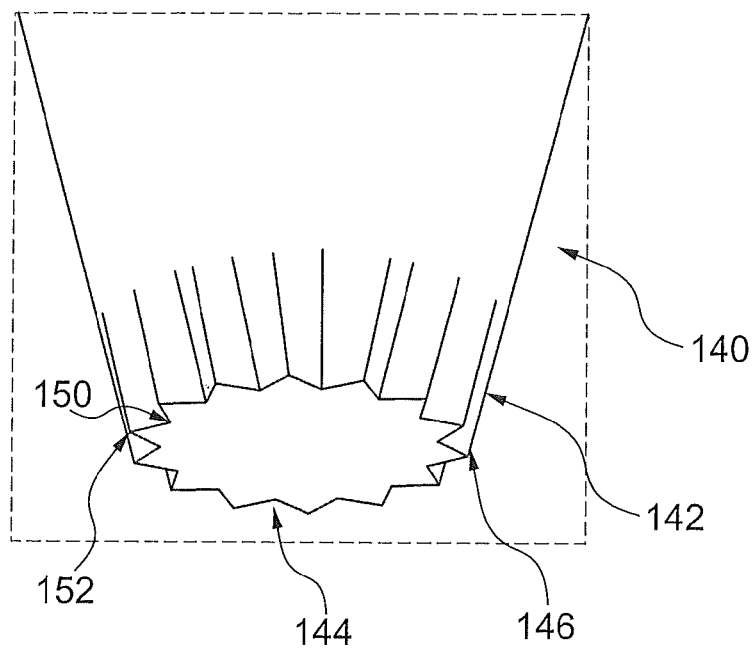
FIGS. 3A and 3B illustrate example perspective views of mixing features of the intake arrangement of FIG. 2, in accordance with an exemplary embodiment of the present disclosure.
Figure 3B:
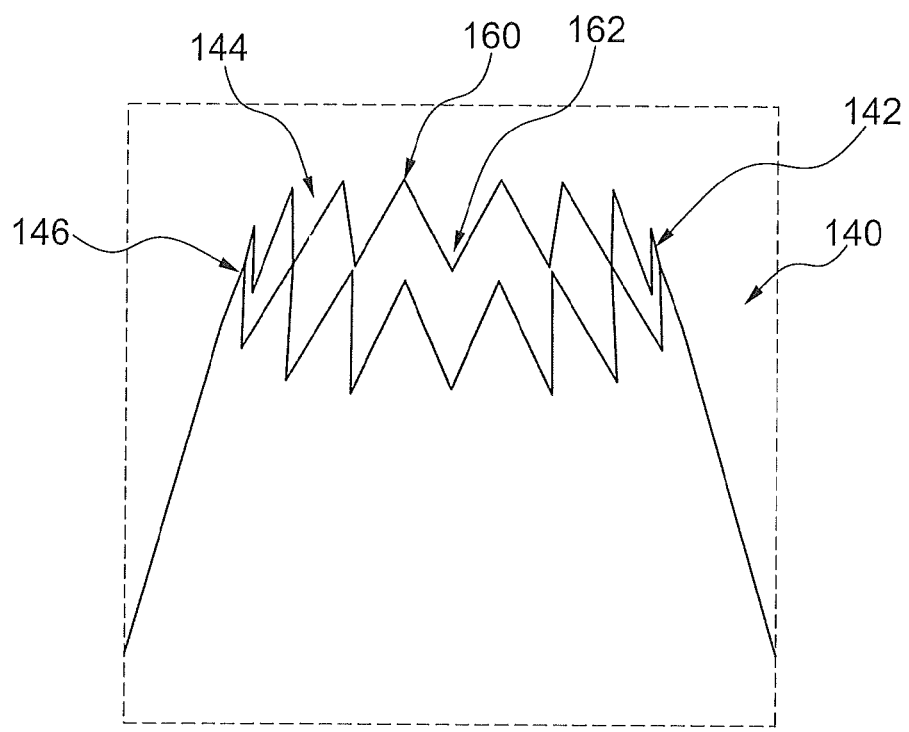

FIGS. 1 to 3B, illustrate various examples of an intake arrangement 100 and components thereof adapted to be configured in relation to a gas turbine engine 10 of a gas turbine power plant 1000 ("plant 1000"). The gas turbine engine 10 includes a compressor 12 with a compressor blading 14 configured there on. FIGS. 1 and 2, respectively, illustrate examples of the plant 1000 and a portion of the plants 1000 depicting the compressor 12 along with the passive intake arrangement 100. Further, FIGS. 3A and 3B illustrate various examples of components the passive intake arrangement 100, in various views. In as much as the construction and arrangement of the passive intake arrangement 100, and the plant 1000 in which relation the passive intake arrangement 100 is adaptable and used, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 3B, in the passive intake arrangement 100, and the plant 1000 in which relation the passive intake arrangement 100 are adaptable, only those components are shown that are relevant for the description of various embodiments of the present disclosure.

Referring to FIG. 1, a diagrammatic illustration of certain elements of the plant 1000 with flue gas recirculation is illustrated, in accordance with an exemplary embodiment of the present disclosure. The plant 1000 includes the gas turbine engine 10 having the compressor 12 and the compressor blading 14 (shown in FIG. 2) configured thereon. The compressor 12 is adapted to receive air stream 1, which is compressed in the compressor 12 for being delivered to a combustion chamber 18 and where the fuel is burnt there with such compressed air. The hot combustion gases are subsequently expanded in a turbine 20. The useful energy generated in the turbine 20 is then converted into electrical energy via generators. Hot flue gases emerging from the turbine 20 may be used, for optimal utilization of the energy still contained in them, in a waste Heat Recovery Steam Generator (HRSG) 22. Further, the flue gas stream from the waste HRSG 22 may be divided into two portions, wherein one portion of the flue gas 2 may be recirculated into the intake arrangement 100 for being mixed with the air stream 1 there for being delivered to the compressor 12. Before mixing the recirculated flue gas 2 with the air stream, it is essentially required to condition the flue gas in terms of cleaning and cooling at a cleaning and cooling section 23. Further, unreturned remaining portion may be discharged into the surroundings through a chimney 24 or may be used for other purposes, either before or after cooling and cleaning.

In FIG. 2, an example of the intake arrangement 100 is illustrated, which may be utilized for enhancing mixing the air with the re-circulated flue gases to the compressor 12.

The intake arrangement 100 is shown to include a manifold 110 and a converging section 130 configured on the manifold 110.

The manifold 110 may include an elongated configuration having a first end portion 112, and a second end portion 114 distal from the first end portion 112. The manifold 110 is arranged in such a manner that the second end portion 114 of the manifold 110 being proximate to the compressor 12. The manifold 110 is configured to be divided into two or more sections, such as sections 118, 120 to convey flue gas streams and air streams.

In one embodiment of the present disclosure, the manifold 110 may be divided into only two sections 118, 120, as known in the art. For that purpose, the manifold 110 includes one barrier 116. The barrier 116 divides the manifold 110 into the two sections 118, 120 extending from the first end portion 112 to the second end portion 114. Further, by the section 118 there conveys a flue gas stream, and, from the other section 120, there conveys an air stream. In another embodiment of the present disclosure, the manifold 110 may be divided into various sections, such as various sections 118, and various sections 120. For that purpose, the manifold 110 may include various barriers, such as the barrier 116, configured to divide the manifold 110 into the plurality of sections, such as various sections 118 and various sections 120 as above, to convey, from one-set of the plurality of sections 118, the flue gas streams, and, from other-set of the plurality of sections 120, the air streams.

Further, the converging section 130 of the intake arrangement 100 is configured along the second end portion 114 of the manifold 110. The converging section 130 may be extending convergingly to the compressor 12 and defining an inlet 16 to the compressor blading 14. The converging section 130 includes inner and outer ring members 132, 134 (hereinafter also referred to as 'ring members 132, 134') disposed convergingly and coaxially to each other. Further, between the ring members 132, 134 there extends, coaxially and convergingly, the barrier 116 to at least up to a distance, such as up to 136, in the converging section 130, defining a converging nozzle 140 therebetween. There may be an aerofoil profile element configured in conjunction to the ring members 132, 134 and barriers 116 to provide structural support thereto. The converging nozzle 140 includes a mixing feature 144, as shown in FIGS. 3A and 3B, and will be explained in conjunction thereto herein below.

In an embodiment, where there are various barriers, such as barrier 116, each barrier extends convergingly between ring members, such as the ring members 132, 134, to at least up to a distance, such as the distance 136 in a converging section, such as the converging section 130, defining a plurality of converging nozzle, such as the converging nozzle 140, therebetween, and each having a mixing feature, such as the mixing feature 144. Herein for the sake of brevity and simplicity, the intake arrangement 100 will be described in relation to the manifold 110 where only two sections 118, 120 are configured, and that all the description with that regards is considered to extend to the various sections 118, and the various sections 120.

The mixing feature 144 is adapted to provide turbulence in the flue gas and air streams upon deployment therefrom, creating a region of high vorticity 'R' in the converging section 130. Specifically, the mixing feature 144 is adapted to promote mixing in the inlet 16 at a point where the air and flue gas streams make contact and along the region of high vorticity 'R.' The flow of the mixed air and flue gas streams from the region of high vorticity 'R' that enters the compressor blading 14 may be much closer to uniform in temperature, pressure, velocity and composition, which may have effect of mitigating the adverse effects on the compressor 12 operating range, surge margin and efficiency. The distance 136 up to which the barrier 116 extends within the converging section 130 may be up to any suitable location posterior to the region of high vorticity 'R.'

Referring now to FIGS. 3A and 3B, various examples of the mixing feature 144 and its configurations are illustrated. The mixing feature 144 may be adapted circumferentially along the converging nozzle 140. In one embodiment of the present disclosure, the mixing feature 144 may be configured along a circumferential edge 146 of a converging side 142 of the converging nozzle 140. Such mixing features 144 extend from the circumferential edge 146 to up to a certain portion against the converging side 142. However, without departing from the scope of the present disclosure, the mixing feature 144 may be configured along any portion of the converging nozzle 140, apart from the converging side 142 or circumferential edge 146, to obtain the desired flue gas and air mixture.

In one embodiment, as shown in FIG. 3A, the mixing feature 144 includes a combination of alternating and adjoining troughs 150 and ridges 152, respectively, bend in and bent out from a plain of the converging nozzle 140. The combination of the troughs 150 and the ridges 152 may be at least one of a wavy and conical shaped configuration. As depicted in FIG. 3A, the combination of the troughs 150 and the ridges 152 is wavy; however, without departing from the scope of the present disclosure, the combination of the troughs 150 and the ridges 152 may be conical.

In another embodiment, as shown in FIG. 3B, the mixing feature 144 includes a combination of alternating and adjoining peaks 160 and depths 162 configured along the plain of the converging nozzle 140. The combination of alternating and adjoining peaks 160 and depths 162 may be at least one of a wavy and conical shaped configuration. Specifically, in FIG. 3B, the conical configuration is depicted.

However, without departing from the scope of the present disclosure, various other configurations of the mixing feature 144, apart from what are disclosed, may be also be possible and shall considered to be part of the disclosure. For example, in further embodiment of the present disclosure, the mixing feature 144 may be obtained by a plurality of additional surfaces disposed along the converging nozzle 140 in order to create a tip vortex therealong to enhance mixing of the flue gas and air streams. Various such other configurations of the mixing feature 144 that are capable of re-energizing the flue gas and air streams by the way of creating the tip vortex to enhance mixing of the flue gas and air streams may also be possible. Such configuration of the mixing feature 144 may include any uneven or zigzag shape, ridges only bent outside or bent only inside from a plain of such nozzle, or any other pattern.

The intake arrangement 100 of the present disclosure is advantageous in various respects. The intake arrangement of the present disclosure is an improved intake arrangement with enhanced mixing of the re-circulated flue gas and fresh ambient air in gas turbine power plants. Specifically, the mixing feature is adapted to provide turbulence in the flue gas and air streams upon creating a region of high vorticity prior to the compressor blading. Such mixing feature promotes mixing at the point where the air and flue gas streams make contact and along the region of high vorticity. Flow of the mixed air and flue gas from the region of high vorticity 'R' that enters the compressor blading is much closer to uniform in terms of temperature, pressure, velocity and composition, which mitigate the adverse effects on the compressor operating range, surge margin and efficiency. Further, the improved intake arrangement is effective in mixing the re-circulated flue gas and the fresh ambient air in the gas turbine power plants in an adaptable and economical manner. The mixing feature as described herein above has no impedance on any of the components of the power plant rather it is advantageous in various respects as described above.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An intake arrangement for a gas turbine engine having a compressor and a compressor blading configured thereon, the intake arrangement, comprising:
    a manifold having first and distal second end portions, the second end portion being proximate to the compressor, the manifold having at least one barrier configured to divide the manifold into at least two sections extending from the first to the second end portion, to convey, from the at least one section, a flue gas stream, and, from the at least other section, an air stream, entering from the first end portion; and
    a converging section configured along the second end portion of the manifold and extending convergingly to the compressor and defining an inlet to the compressor blading, the converging section having inner and outer ring members disposed coaxially to each other, wherein between the inner and outer ring members there extends, coaxially and convergingly, the at least one barrier to at least up to a distance in the converging section, defining a converging nozzle therebetween, wherein the converging nozzle comprises a mixing feature at a point where the flue gas stream and the air stream make initial contact adapted to provide turbulence in the flue gas and air streams upon deployment therefrom, creating a region of high vorticity 'R' in the converging section and configured to promote mixing of the flue gas and air streams to convey mixed composition of the flue gas and air streams to the compressor blading, improving the compressor operating range.

2. The intake arrangement as claimed in claim 1, wherein the at least one barrier of the manifold comprises a plurality of barriers, configured to divide the manifold into a plurality of sections extending from the first to the second end portion, to convey, from one-set of the plurality of sections, the flue gas streams, and, from other-set of the plurality of sections, the air streams.

3. The intake arrangement as claimed in claim 2, wherein the plurality of barriers extends convergingly between the inner and outer ring members to at least up to the distance in the converging section, defining a plurality of converging nozzle therebetween, and each having the mixing feature.

4. The intake arrangement as claimed in claim 1, wherein the distance up to which the barrier extends within the converging section is posterior to the region of high vorticity 'R'.

5. The intake arrangement as claimed in claim 1, wherein the mixing feature is arranged circumferentially along the converging nozzle.

6. The intake arrangement as claimed in claim 1, wherein the mixing feature comprises:
    a combination of alternating and adjoining troughs and ridges that, respectively, bend in and bent out from a plain of the converging nozzle.

7. The intake arrangement as claimed in claim 6, wherein the combination of the troughs and the ridges is at least one of a wavy and conical shaped configuration.

8. The intake arrangement as claimed in claim 1, wherein the mixing feature comprises:
    a combination of alternating and adjoining peaks and depths arranged along a plain of the converging nozzle.

9. The intake arrangement as claimed in claim 8, wherein the combination of the peaks and the depths is at least one of a wavy and conical shaped configuration.

10. The intake arrangement as claimed in claim 1, wherein the mixing feature comprises:
    a plurality of additional surfaces disposed along the converging nozzle.

* * * * *